United States Patent
Holmes

(10) Patent No.: US 12,033,679 B2
(45) Date of Patent: Jul. 9, 2024

(54) TAPE READER

(71) Applicant: TAPE ARK, East Perth (AU)

(72) Inventor: Guy Holmes, East Perth (AU)

(73) Assignee: TAPE ARK, East Perth (AU)

( * ) Notice: Subject to any disclaimer, the term of this patent is extended or adjusted under 35 U.S.C. 154(b) by 0 days.

(21) Appl. No.: 17/852,058

(22) Filed: Jun. 28, 2022

(65) Prior Publication Data

US 2022/0415348 A1    Dec. 29, 2022

Related U.S. Application Data

(60) Provisional application No. 63/215,801, filed on Jun. 28, 2021.

(51) Int. Cl.
*G11B 5/584* (2006.01)
*G11B 5/48* (2006.01)
*G11B 15/087* (2006.01)
*G11B 15/18* (2006.01)

(52) U.S. Cl.
CPC ............ *G11B 5/584* (2013.01); *G11B 5/4893* (2013.01); *G11B 15/087* (2013.01); *G11B 15/18* (2013.01)

(58) Field of Classification Search
None
See application file for complete search history.

(56) References Cited

U.S. PATENT DOCUMENTS

| | | | | |
|---|---|---|---|---|
| 5,729,133 | A * | 3/1998 | Sakai | G01N 17/00 324/210 |
| 2001/0006437 | A1* | 7/2001 | Leonhardt | G11B 5/588 |
| 2006/0133227 | A1* | 6/2006 | Bertholom | G11B 7/123 |
| 2011/0109998 | A1* | 5/2011 | Berman | G11B 5/3163 427/101 |
| 2013/0200886 | A1* | 8/2013 | Kirste | G01D 5/34792 29/407.01 |
| 2022/0415348 | A1* | 12/2022 | Holmes | G11B 15/087 |

OTHER PUBLICATIONS

English Translation of Hwang, KR 930012146 B1, published Dec. 24, 1993.*

* cited by examiner

*Primary Examiner* — Peter Vincent Agustin
(74) *Attorney, Agent, or Firm* — Polsinelli LLP

(57) ABSTRACT

A tape reader is provided that reads data from a tape without requiring specific alignment. The tape reader may include a reader head comprising a sensor array with a plurality of sensors that detect the data independent of the track within which the data is stored. Multiple sensors may detect data in each track instead of a single, dedicated sensor for each track. The sensor array may comprise multiple sensors in multiple dimensions, such as perpendicular to the movement of the tape or in parallel to the movement of the tape, including serpentine linear recording formats where the sensors may be in a matrix positioned at various angles from horizontal to vertical.

17 Claims, 3 Drawing Sheets

TAPE READER

CROSS-REFERENCE TO RELATED APPLICATIONS

The present patent application claims the priority benefit of U.S. provisional patent application No. 63/215,801 filed Jun. 28, 2021, the disclosure of which is incorporated by reference herein.

BACKGROUND OF THE INVENTION

1. Field of the Invention

The present invention generally relates to a magnetic tape reader for reading a variety of different magnetic tape formats.

2. Description of the Related Art

Since the 1950's, tapes have provided the most common medium upon which data is digitally stored and saved for both re-use as well as long term preservation/archives. Commonly, the tape is in the form of a magnetic tape comprising a plastic film with a ferrous-oxide coating. The side of the tape bearing the coating stores the data, while the other side is configured to provide strength to the tape.

In order to write to or read from a tape, the tape passes through a tape drive path. The tape drive has motors to cause the tape to pass over a tape head or heads between two reels. Dedicated tape heads may read, write, or delete data from the tape.

Data may be stored on a tape in a number of data tracks. The tape typically also includes one or more 'non-data' tracks which provide information that assists with read quality off the tape.

A reader head of the tape drive has a number of sensors for reading the tape. Each track has a dedicated sensor, which is independent of the sensors for the other tracks. These sensors are provided on the read head, which engages the side of the tape upon which the data is stored. The sensors capture the data before the data is processed into the required format.

One or more additional tracks may be included on the tape to assist with read quality and can include information such as parity tracking, dock information, or timing related data to provide a form of error detection and correction. Other tracks called service tracks, usually written to the non-data side of the tape, also provide a track alignment information and correction. Tape tracking is essential to ensure the tape and the read head remain in alignment, and therefore individual tracks remain aligned with its dedicated track sensor.

Since its first inception, magnetic tape has undergone continuous development with the view of increasing the storage capacity of the tape. This has resulted in different tape formats and configurations, each of which typically require different tape readers in order to retrieve the data. Many and varied types of tape drives have been released by different manufacturers, and subsequently, old tape devices were superseded with newer technology.

The archives of numerous companies include tapes in offsite storage, which have been stored for many years. Many of these tapes—a large portion of which were created over 30 years ago—have become fragile, suffered from deterioration, or from a fragile condition called stiction. Extreme care must be taken when retrieving data from these tapes.

Further difficulties arise in relation to retrieving data due to the lack of availability of the correct type of tape reader, and where the original tape reader is available, its ability to retrieve the data without damaging the tape.

Typically, the old equipment used to read the tape has not been maintained and therefore prone to malfunction, or its importance has been overlooked and the equipment discarded. As tape readers for old tapes are no longer manufactured, anyone with an old tape needs to rely on a legacy device (e.g., original equipment that created the tape), which can be difficult to locate and obtain. Reading these tapes on legacy devices greatly increases the possibility of severe tape damage and data loss due both to the delicate nature of the tape media, but also the crude reading methods of the original equipment, which were not designed to take into account the now fragile condition of tape media.

There is, therefore, a need in the art for improved systems and methods for reading a variety of different magnetic tape formats.

SUMMARY OF THE CLAIMED INVENTION

Embodiments of the present invention may provide a tape reader that ameliorates, mitigates, or overcomes one or more disadvantage of the prior art and provide improved magnetic tape reading. As used herein, the term "tape" may be used to describe any media in the form of a long, narrow, and/or flexible material capable of having data read therefrom. The tape may be stored on one or more reels, which may be exposed or contained within a cartridge. Tape may be used to store analog or digital data. Digital data is typically stored in a plurality of parallel tracks, but may also be recorded in a helical scan format or a serpentine linear format. The tapes may have tracks that range from as few as one track, and as many as several thousand tracks. The width of the tape may also range from 4 mm to 1 inch in width.

Embodiments of the present invention may include a tape reader for reading data from a tape. The tape reader may include a reader head comprising a sensor array with a plurality of sensors that detect the data independent of the track within which the data is stored. Multiple sensors may detect data in each track instead of a single, dedicated sensor for each track. The sensor array may comprise multiple sensors in multiple dimensions, such as perpendicular to the movement of the tape or in parallel to the movement of the tape, including serpentine linear recording formats where the sensors may be in a matrix positioned at various angles from horizontal to vertical.

Embodiments of the present invention may include a tape reader for reading data from a magnetic tape. The tape reader may provide a reader head comprising a sensor array that has a plurality of sensors. The sensors may detect the data independent of the track within which the data is stored. In an embodiment, the data on the tape is read by the sensor array without requiring the tape to physically contact the reader head. The sensor array may comprise magnetic read sensors or alternatively optical sensors that may be paired with a light source to increase the contrast of the data stored on the magnetic tape. The types of sensors may include, but are not limited to, magnetic, optical, and magneto-optical sensors.

Embodiments of the present invention may include a tape reader for reading data from a tape. The tape reader may provide a reader head comprising a sensor array that provides a continuous sensor region for detecting the data on the tape as the tape passes across the reader head independent of tape alignment. Traditional tape drives have a dedicated sensor to read each track, such that a misalignment would prevent the tape drive from reading the data stored on the tape. With a sensor array with multiple sensors capable of reading the data stored on each track, however, the data may still be read with a much greater alignment tolerance that allows for reading when the data stored on the tape is aligned with the sensor array as opposed to requiring each track to be aligned with each dedicated read sensor.

In contrast to the prior art, the tape reader described herein does not require a dedicated sensor for each track of data, thus eliminating the need to ensure the tape is and remains properly aligned with the reader head. As a result, the tape reader is capable of reading data from tapes of different formats, including tapes that have differing numbers of tracks. Common legacy tapes used 7, 9, 14, or 21 tracks. Modern tapes can have 32 or a significantly greater number of tracks measuring in the thousands. The tape reader described herein is capable of reading a tape with any number of tracks that is equal to or less than the number of sensors in the sensor array, where the physical dimensions of the tape are not greater than the sensor array. Compatibility may further be dependent on the spacing of the tracks and the sensors in the sensor array when reading large numbers of tracks, such as when the ratio of sensors in the sensor array to the number of tracks is less than 2 to 1.

A further advantage of having a track independent sensor array is that the tape reader is able to read the entire tape in one pass and is not required to stop the tape when the sensor no longer senses a track, as is the case with prior art tape readers. If a damaged tape passes through such a legacy tape reader, the legacy tape reader may stop reading the tape, and the travel of tape through the legacy tape reader shuts down. This is not the case with the improved tape reader described herein. As the sensor array is not dependent on any particular track, the tape may continue to pass over the reader head from start to finish, regardless of the state of the tape. Furthermore, the sensor array may sense any residual magnetic field around the damaged section and enables data collection all the way up to the where the tape is damaged. The sensor array may also gather data from the damaged area where residual magnetic fields are detected, despite the absence of the full complement of the oxide usually present on the tape. The data may be reconstructed by mapping the magnetic fields of each of the surrounding bits of data including the residual magnetic fields and using machine learning algorithms to predict the value of the damaged or missing data. In some embodiments, one or more bits of data may be completely missing and predicted based upon the surrounding bits of data that make up the corresponding byte.

More than one sensor may detect the data from the same track. The sensor array may comprise a plurality of sensors in the same width of each track such that a plurality of sensors may read the data on a track of data simultaneously. In an embodiment, a track is 2 mm wide, but each sensor in a sensor array is 0.1 mm wide, therefore the track may be read by as many as 20 sensors in the sensor array. In further embodiments, the sensor array may comprise multiple dimensions, increasing the number of sensors capable of reading a single track by multiples of the depth of the sensor. In the previous example, 20 sensors could read a single track if positioned in a line perpendicular to the width of the track or the movement of the tape, therefore if the depth of the sensor array was 10 sensors, up to 200 sensors could read a single track.

Preferably the reader head is adapted to read the data from the tape without the reader head contacting the tape as the tape passes across the reader head. In an ideal embodiment, the reader head is maintained at a distance of less than 100 Microns from the reader head though the distance may vary from directly contacting the reader head to a distance up to 5 mm from the reader head. In prior art tape readers, the data side of the tape is required to contact the reader. This can damage the data on the tape but can also cause physical damage to the tape and tape read head itself.

Due to their age, or the manner in which the tapes have required to be treated, the tapes may be non-planar as it passes over the reader head. In embodiments of the present invention, as the reader head is not required to contact the tape, the sensor array is still able to detect and read the data from the tape.

Preferably the plurality of sensors are linearly arranged on the reader head. Preferably the plurality of sensors are linearly arranged on the reader head such that the line of sensors are substantially perpendicular to the travel of the tape when the tape passes the reader head. In some embodiments, multiple lines of sensors may be positioned parallel to one another, each perpendicular to the travel of the tape. The multiple lines of sensors may be arranged into a continuous array of sensors to form a rectangular sensor array, including an optical image sensor. Further embodiments may include sensors forming a checkerboard pattern, lines of sensors arranged at an angle, instead of perpendicular to the travel of the tape, in diamond patterns, etc.

The sensor array may comprise multiple lines of sensors. This provides the sensor array with redundancies should one or more sensors fail. It also provides a means of validating the data by comparing the data detected by different lines of sensors. In traditional tape drives, if a sensor fails to read data, it results in any of a read error, corrupted data, and even a read interrupt. With parallel sensors, if the first line of sensors fails to accurately read one or more bits of data, the second, third, etc. sensors may be able to read the correct value. Each of the read values may be compared and the correct value determined by simple methods such as averaging or using a simple majority of values read by the parallel sensors, or algorithms including machine learning to predict the correct value. Even in cases of missing oxide, the sensors may be capable of collecting information from the print-through and residual magnetic field that may be resident in the mylar of the tape rather than the magnetic recording material.

The tape reader may be made from a low heat inducing, smooth material. In various embodiments the reader head may be coated with a low friction material, and/or may be cooled. The reader head may be ceramic or may be ceramic coated. While the reader head is not required to contact the tape to read the tape, the choice of material for the reader head is important to prevent stiction and heat generation in the event the tape makes contact with the tape head, minimizing the likelihood of damage to the tape/data.

The sensor array may comprise several hundred to over 20,000 sensors. The sensors may be arranged in a 3 cm×3 cm area. This area accommodates all widths of tapes created to date. The sensors used may vary or be interchangeable, and may be tunnel magnetoresistive elements, giant magnetoresistive elements, anisotiopic magnetoresistive elements, semiconductor magnetoresistive elements, Hall elements, or any of many other types of elements suitable to the field strength of the magnetic material on the tape.

The sensor array may be in communication with a processing means and a display means. The processing means may receive the signals from the sensor array and display them on the display means in the form of a heat map. The heat map comprising an array of values corresponding to the strength of the magnetic fields measured by each sensor such that each peak in the value of the magnetic fields represent bits of data. The peaks may comprise positive and negative values such that for example, a positive value corresponds with a 1 and a negative value corresponds with a 0. This is in contrast to prior art tape readers which provide a binary output only. The heat map may visually represent the magnetic fields on the tape. This visual representation allows an operator to readily identify any parts of the tape which are damaged and not readable. The operator may be a user or may alternatively be an artificial intelligence or machine learning algorithm which can identify parts of the tape which are unreadable and may additionally reconstruct the data by predicting the values of the missing data. This may include the identification of the format in which the data is saved and then predicting the missing values based upon the surrounding values using historical data. Tape data is generally written in blocks and files, where files are made up of one or more blocks. The artificial intelligence and machine learning algorithms may be trained to read all file formats created by any software capable of writing to tapes including but not limited to formats such as BRU, SEGY, SEGD, and industry standard backup formats such as TAR and LTFS.

The processing means comprises a receiving portion for receiving the digital output from the reader head. The heat map represents magnetic fields that can identify if the field is either positive, negative, or null. These fields can be converted to voltages, and then into binary data. The heat map may also provide a visual representation from which damaged sections of the tape can be readily identified.

The heat map also represents error detection where the sensor array comprises multiple lines of sensors. The heat map may comprise a value obtained by each sensor. Missing data may be represented by unexpected values being present where a bit is expected. For example, the values being consistent with a null value rather than a positive or negative value, or alternatively a weak positive or negative value without a peak strong enough to denote a clear bit value. In alternate embodiments, the heat map may be comprised of fewer values than sensors if multiple sensors are used to resolve the values of the heat map such as by averaging multiple adjacent values. In an embodiment, four sensors may be averaged into each value represented on the heat map allowing for error detection and correction at the sensor level prior to analyzing the heat map. In some embodiments, the heat map may represent data over time, such as when multiple parallel lines of sensors acquire the same bits of data over time, and the heat map used to confirm the value of each bit, such as by assuming the most common indicated bit value is correct, such as if of six values for one bit, four are positive and two are negative, the correct value is assumed to be positive. In addition, by using the endianness of the byte structure, the machine learning algorithms can predict the upper and lower limits of a byte value so that a range of what the byte should equal can be predicted.

The tape reader may comprise a support adjacent the reader head, the support is adapted to support the tape as the tape passes the reader head. The support may be spaced from the reader head such that the tape does not engage the reader head. The support may maintain the tape at a consistent distance from the reader head and may additionally keep the tape flat, and at a consistent tension. The support may alternatively be adjustable, moving the tape closer or further to the reader head, which may be configured or determined dynamically based upon whether the data is being consistently read or if read errors are detected. The support may be adapted to engage the non-data side of the tape as the tape passes the reader head. The support may be in the form of a motor driven capstan that drives the tape through the tape path, or a capstan that acts as a spindle which rotates with the tape passing thereover. As the support is in contact with the more robust side of the tape and does not contact the data side, the likelihood of damage to the tape/data is minimized.

In various embodiments the capstan may be coated with a low friction material, and/or may be cooled.

The tape reader may comprise a drive mechanism to drive the tape past the reader head in forward and reverse directions. The drive mechanism may have multiple configurations to handle the various tape types to drive the tape through the tape reader. For example, the drive mechanism may be configured to drive and read data from tapes of formats including Linear Tape-Open (LTO), Digital Linear Tape (DLT), Digital Audio Tape (DAT), Advanced Intelligent Tape (AIT), Quarter Inch Cartridge (QIC), open reel 7, 9 and 21 track tapes, 4 mm and 8 mm Exabytes, etc.

The tape reader may be adapted to read tapes stored in a range of housings. The tape reader may be adapted to read data from tapes stored on a reel (open reel) or a cassette (closed reel).

The tape reader may also comprise an image sensor for recording the reading of the tape. The image sensor may be synchronized with the tape reader. The image sensor allows an operator to visually inspect the tape in those cases where the heat map identifies a damaged section of tape. The operator may be a user or an automated system such as a machine learning algorithm. The image sensor may be an optical sensor or camera to capture visible light data or may alternatively capture data from other electromagnetic wavelengths such as the infrared spectrum. In some embodiments, multiple image sensors may be utilized in parallel such as those which can detect visible light, infrared, ultraviolet, etc. Image sensors may additionally be used simultaneously or in parallel with magnetic read sensors to read the tape using multiple methods which may be cross referenced to identify damaged tape and otherwise validate the data read from the tape.

DETAILED DESCRIPTION

Embodiments of the present invention provide a tape reader 100 which is capable of reading data from a variety of different formatted tapes 110. The tape reader 100 is adapted to retrieve/read the data without making contact with the tape 110.

Figure 1:
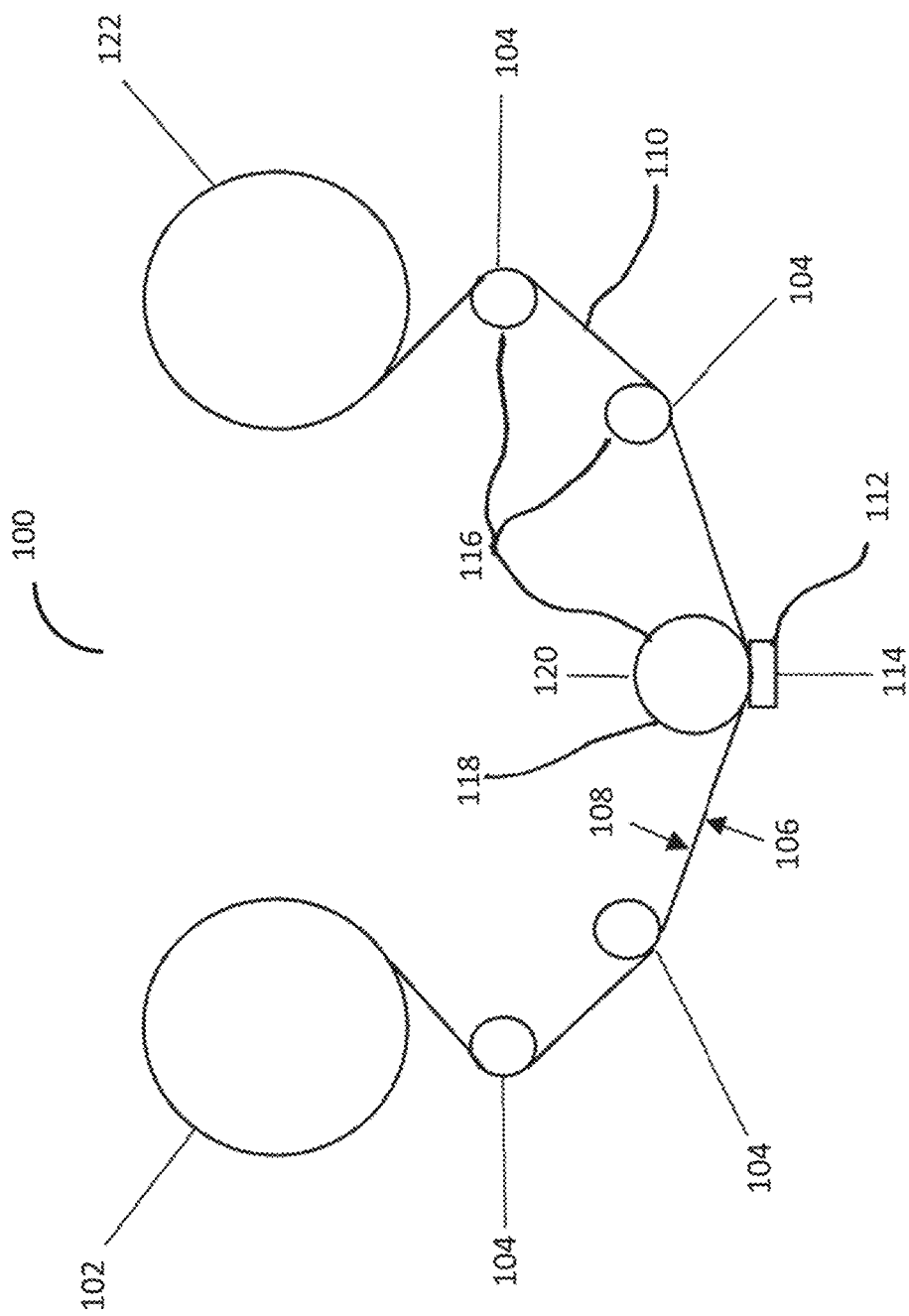
FIG. 1 is a schematic of an exemplary tape passing through a tape reader.
Figure 2:
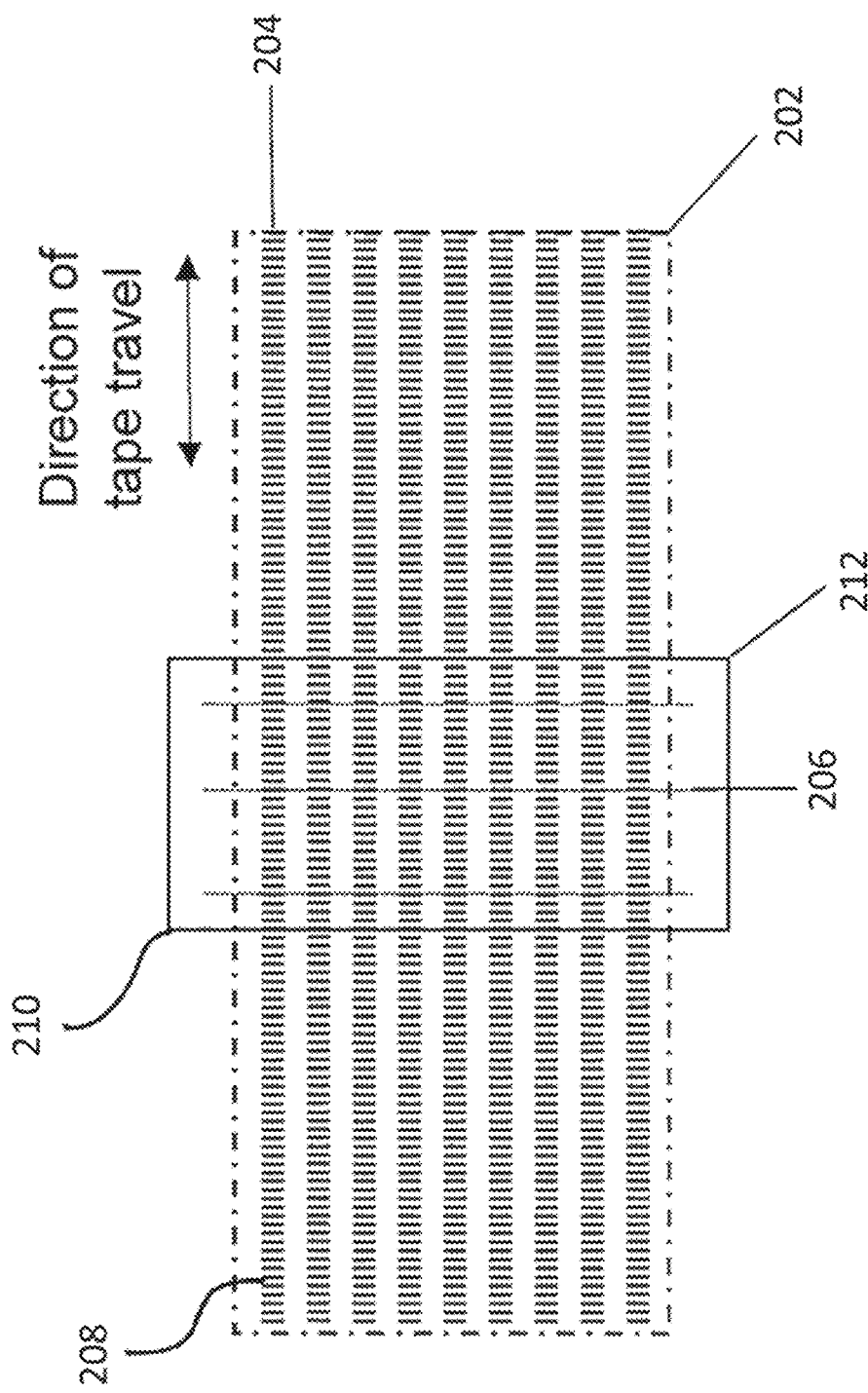
FIG. 2 is a schematic of an exemplary tape passing over a sensor array.

FIGS. 1 and 2 illustrate a tape reader 100 for reading data from a magnetic tape 110. In this embodiment, the tape 110 has nine tracks 204, as best represented in FIG. 2. However, a tape with more or less tracks could also be read by the tape reader 100. For example, the tape reader 100 could read tapes with 7, 14, 21, or more tracks in addition to 9 track tapes.

The tape reader 100 provides a reader head 210 comprising a sensor array 212. The sensor array 212 incorporates a plurality of sensors wherein the sensors detect data independent of the track the data is stored. The sensors may comprise at least magnetic sensors capable of detecting and quantifying the strength of a magnetic field at the sensor, or an image sensor such as may be used in a camera to acquire an image or data comprising an array of pixels. The sensors used may vary or be interchangeable, and may be tunnel magnetoresistive elements, giant magnetoresistive elements, anisotropic magnetoresistive element, semiconductor magnetoresistive element, or Hall elements or other types.

As represented in FIG. 2, the plurality of sensors are arranged in three sub-sets of sensors wherein in each subset the sensors are arranged to be in a line 206. In effect this provides a means to read the data three times allowing for the accuracy of the read data to be checked. The sensors may be arranged in a plurality of sub-sets or may comprise a continuous array. For example, the sensors may comprise at least one sub-set of sensors which may be arranged linearly or in one or more patterns which may further be arranged parallel to the adjacent sub-sets. The sensors may alternatively be arranged in a pattern such as a checkerboard. A checkerboard pattern may be used to interpose a second sensor type within an array of a first sensor type. A sensor array may alternatively be a continuous array of sensors, such as in an imaging sensor.

The tape reader 100 comprises a drive mechanism 116 to drive the tape 110 past the reader head 112 in forward and reverse directions which may enable the reading of data in either the forward or reverse directions. The drive mechanism 116 incorporates a support 118 adjacent the reader head 112 which supports the tape as the tape passes the reader head.

The support 118 is in the form of a motor driven capstan 120 that drives the tape through a tape path and is spaced from the reader head 112 such that the tape does not engage the reader head 112. In some embodiments, the support 118 may be movable and may receive inputs from the reader head 112 to either move the tape 110 closer to the reader head 112, or alternatively move the reader head 112 to ensure consistent reading of data from the tape 110. A sensor may be included to detect the distance or contact of the tape 110 and the reader head 112 and adjust the distance to prevent prolonged contact.

The drive mechanism 116 also comprises take-up and release spools 102, 122, and tape path spindles 104.

In operation the tape 110, stored on reel release spool 102 is placed in the tape reader 100. The tape extends from the reel release spool 102 to a take-up spool 122, to be fed thereon. Between the reel release spools the tape passes over spindles 104 and the capstan 120. As the tape passes over the capstan 120 on one side, the data side 106 of the tape 110 passes the reader head 112 such that the tracks on the tape 110 can be read by the sensor array 114.

Once the data has been read and processed by a processing means it is presented in a heat map. The heat map represents magnetic fields that can identify if the field is either positive, negative, or null. These fields can be converted to voltages, and then into binary data. For example, a positive value may ultimately correspond to a binary 1, a negative value may correspond to a binary 0, and null or absent field values may represent no data or missing data. Missing data may be identified by one or more null values surrounded by positive and/or negative values, whereas no data, such as where no data has been saved to the tape, may be indicted by a region with only null values and no positive or negative values.

The reading of a tape 110 on the tape reader 100 does not require a determination of the format to create the output. For example, traditional drives must identify the type of data to be read and a read error may occur if the data does not match the values expected for the indicated format. Tape reader 100 reads the data via interpolation of magnetic fields over an area instead of directly reading individual bits, therefore not requiring a format to read and outputs the stored data. The sensors on the sensor array 114 are used either singularly or in groups to read the bits recorded on the tape 110 where any number of sensors can be used to read a single bit, or multiple bits in conjunction. The tape reader 110 also deploys several other design implementations that reduce the risk of damage to tape media and captures additional data regarding the physical condition of the media. For example, tension and distance or contact sensors may be employed to ensure consistent tension is maintained to prevent breakages and that the tape 110 is maintained at a distance adequate to read the data without contacting the reader head 112. Sensors may further monitor the alignment of the tape 110 and/or guides used to ensure the tape does not slip, fray or tear.

Prior art tape readers work on the basis of reading a track 302, checking its parity, and accepting the data as correct or not. For example, if one track 302 of a nine-track tape is not readable, then all data on the rest of the tracks 302 at that point are designated as a "hard error" and no data is created for that whole sample. Traditional drives require that all bits within a byte of stored data be readable, therefore a missing or corrupted bit result in unresolved data and generates a read error. Tape reader 100 reads the magnetic fields, not the bits directly, therefore providing additional data and processing steps allowing for the missing data to potentially be reconstructed based upon the surrounding data instead of simply generating a read error. This additionally facilitates recovery by digitizing the retrievable data from the tape 110 which otherwise would require cumbersome and largely manual data recovery methods. In certain embodiments, the heat map represents the magnetic signal of all tracks 302 that are present, even if one is missing. While one track 302 may be damaged the present tape reader 100 may at least read the other eight tracks 302, whereas the prior art would not provide any information and would report an error. The heat map may visually identify which track 302 is missing. Visual identification may comprise a user manually reviewing the heat map or alternatively an artificial intelligence or machine learning algorithm identifying missing data based upon the heat map.

Figure 3:
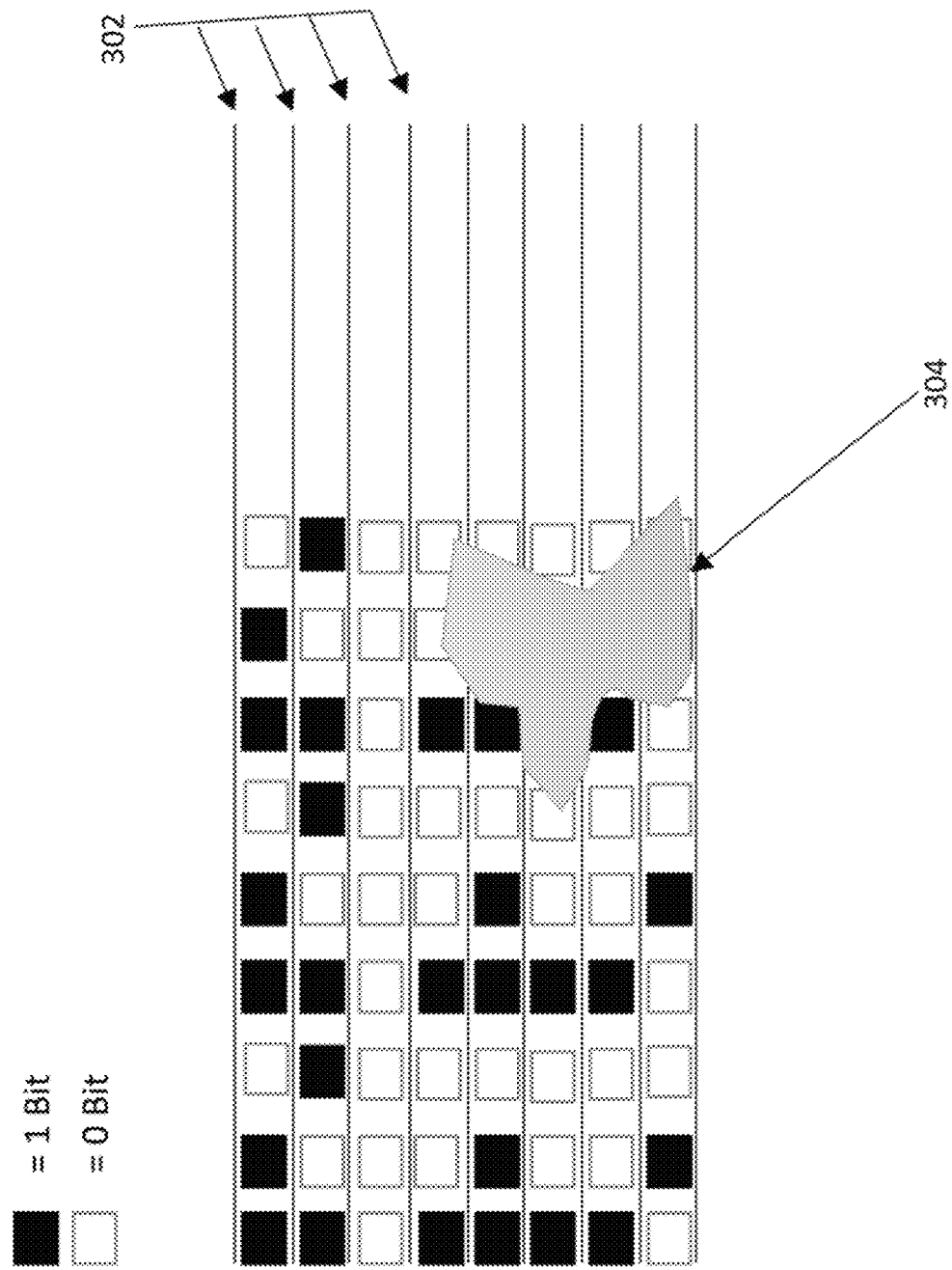
FIG. 3 is a schematic representation of data on an exemplary tape.

FIG. 3 shows a nine-track tape where data has been damaged 304 and cannot be read, as indicated by the solid squares. Where one of the solid squares is not readable in the first column, then in prior art tape readers, the entire column across all tracks 304 is ignored. This is not the case in tape reader 100, which would be able to read at least all data which is not damaged or obscured. Tape reader 100 would be able to detect residual magnetic fields from damaged tape and therefore could determine the value of a missing bit which would otherwise be unreadable. Additionally, machine learning may be used to predict the value of a missing bit based upon the data stored in the surrounding bits, including residual magnetic fields.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A magnetic tape reader system, the system comprising:
   a reader head comprising a sensor array that includes a plurality of sensors, wherein the sensors in the sensor array are configured to provide a continuous sensor region that detects data on a magnetic tape that is passed across the continuous sensor region of the reader head; and
   a capstan support that supports the magnetic tape during passage across the continuous sensor region of the reader head without contacting the reader head.

2. The system of claim 1, wherein sensors in the sensor array detect the data within the continuous sensor region without requiring alignment to any specific one of the sensors.

3. The system of claim 1, wherein the magnetic tape includes a plurality of tracks, and wherein sensors in the sensor array are configured to detect the data independent of which of the tracks with which the data is associated.

4. The system of claim 3, wherein the magnetic tape includes a damaged portion, and wherein the sensors in the sensor array are further configured to sense residual magnetic field associated with the damaged portion.

5. The system of claim 1, further comprising a processor that executes instructions to generate a heat map that visually represents one or more magnetic fields associated with the magnetic tape.

6. The system of claim 4, further comprising a processor that executes instructions to use machine learning to predict one or more values associated with the damaged portion based on one or more residual magnetic fields or print-through.

7. The system of claim 6, wherein the prediction is further based on one or more portions of the magnetic tape that surround the damaged portion.

8. The system of claim 1, wherein the sensors in the sensor array are arranged at multiple depths, wherein the sensors at different depths read the data from a same track of the magnetic tape.

9. The system of claim 1, wherein the support is adjustable to move the magnetic tape closer to or farther from the reader head.

10. The system of claim 1, wherein the support is configured to contact only a non-data side of the magnetic tape during passage across the continuous sensor region of the reader head.

11. The system of claim 1, wherein the support comprises a motor-driven capstan spindle that rotates the magnetic tape, wherein the capstan spindle is coated with a low-friction or cooling material.

12. The system of claim 1, wherein the sensors in the sensor array are arranged perpendicularly to the passage of the magnetic tape.

13. The system of claim 1, wherein the sensors in the sensor array are arranged in multiple lines that form a regular pattern.

14. The system of claim 1, further comprising a processor that executes instructions to validate the data by comparing different reads from the sensors in the sensor array.

15. The system of claim 1, wherein the sensors in the sensor array are configured to detect data on a data side of the magnetic tape that is passed across the continuous sensor region of the reader head.

16. A reader head device, the device comprising:
   a sensor array that includes a plurality of sensors, wherein the sensors in the sensor array are arranged to provide a continuous sensor region that detects data on a magnetic tape that is passed across the reader head, wherein the magnetic tape is supported by a capstan support during passage across the continuous sensor region of the reader head without contacting the reader head.

17. A sensor array device, the device comprising:
   a plurality of sensors, wherein the sensors are arranged to provide a continuous sensor region that detects data on a magnetic tape that is passed across a reader head, wherein the magnetic tape is supported by a capstan support during passage across the continuous sensor region of the reader head without contacting the reader head.

* * * * *